US011504946B2

United States Patent
Kauffmann et al.

(10) Patent No.: US 11,504,946 B2
(45) Date of Patent: Nov. 22, 2022

(54) DEVICE AND METHOD FOR CONNECTING LAMINATION PARTS TO FORM A LAMINATION STACK

(71) Applicant: Voestalpine Automotive Components Dettingen GmbH & Co. KG, Dettingen an der Erms (DE)

(72) Inventors: Jochen Kauffmann, Ebersbach (DE); Heinrich Bursy, Erkenbrechtsweiler (DE)

(73) Assignee: voestalpine Automotive Components Dettingen GmbH & Co. KG, Dettingen an der Erms (DE)

( * ) Notice: Subject to any disclaimer, the term of this patent is extended or adjusted under 35 U.S.C. 154(b) by 352 days.

(21) Appl. No.: 16/492,567

(22) PCT Filed: Mar. 9, 2018

(86) PCT No.: PCT/EP2018/055982
§ 371 (c)(1),
(2) Date: Sep. 9, 2019

(87) PCT Pub. No.: WO2018/162752
PCT Pub. Date: Sep. 13, 2018

(65) Prior Publication Data
US 2020/0039181 A1     Feb. 6, 2020

(30) Foreign Application Priority Data
Mar. 9, 2017    (EP) ................................. 17160212

(51) Int. Cl.
*B32B 7/12*     (2006.01)
*B32B 15/04*    (2006.01)
(Continued)

(52) U.S. Cl.
CPC ............... *B32B 7/12* (2013.01); *B32B 15/04* (2013.01); *B32B 27/16* (2013.01); *B32B 37/12* (2013.01);
(Continued)

(58) Field of Classification Search
CPC .......... B32B 7/12; B32B 15/04; B32B 27/16; B32B 37/12; B32B 38/0004;
(Continued)

(56) References Cited

U.S. PATENT DOCUMENTS

2018/0133998 A1* 5/2018 Theis .................... B31B 50/26

FOREIGN PATENT DOCUMENTS

DE       2446693 A1     4/1976
EP       0173852 A1     3/1986
(Continued)

OTHER PUBLICATIONS ip.com Concept Search (Year: 2021).*
JP2004023829A Machine Translation of Description (from Google Patents) (Year: 2021).*

*Primary Examiner* — Cynthia L Schaller

(57) ABSTRACT

A device and a method for connecting lamination parts to form a lamination stack, in which lamination parts are punched out from an electrical strip that is coated on at least one of its flat sides with a hot-melt adhesive varnish layer, the lamination parts that have been punched out are stacked, and then connected in an integrally joined manner through thermal activation of the hot-melt adhesive varnish layer to form a plurality of lamination stacks. Before the lamination parts are punched out, the electrical strip is prepared in a subregion of the hot-melt adhesive varnish layer in such a way that after the lamination part is punched out, this lamination part facilitates separation of the stacked lamination parts into lamination stacks. In the preparation of the (Continued)

electrical strip, the layer thickness of the hot-melt adhesive varnish layer on the electrical strip is at least reduced through removal by laser light in order to produce the subregion.

10 Claims, 4 Drawing Sheets

(51) Int. Cl.
*B32B 27/16* (2006.01)
*B32B 37/12* (2006.01)
*B32B 38/00* (2006.01)
*B32B 38/04* (2006.01)

(52) U.S. Cl.
CPC ... *B32B 38/0004* (2013.01); *B32B 2037/1215* (2013.01); *B32B 2038/042* (2013.01)

(58) Field of Classification Search
CPC ...... B32B 2037/1215; B32B 2038/042; B32B 41/00; H02K 1/04; H02K 15/02; H01F 41/0233
See application file for complete search history.

(56) References Cited

FOREIGN PATENT DOCUMENTS

| | | | |
|---|---|---|---|
| JP | 2004023829 A | * | 1/2004 |
| JP | 2004023829 A | | 1/2004 |
| WO | 2014089593 A1 | | 6/2014 |

* cited by examiner

DEVICE AND METHOD FOR CONNECTING LAMINATION PARTS TO FORM A LAMINATION STACK

FIELD OF THE INVENTION

The invention relates to a device and a method for connecting lamination parts to form a lamination stack, in which lamination parts are punched out from an electrical strip that is coated on at least one of its flat sides with a hot-melt adhesive varnish layer, the lamination parts that have been punched out are stacked, and then they are connected in an integrally joined manner through thermal activation of the hot-melt adhesive varnish layer to form a plurality of lamination stacks; before the lamination parts are punched out, the electrical strip is prepared in a subregion of the hot-melt adhesive varnish layer in such a way that after the lamination part, which comprises this prepared subregion, is punched out, this lamination part facilitates the separation of the stacked lamination parts into lamination stacks.

BACKGROUND OF THE INVENTION

In order to be able to disconnect the lamination parts, which have been pre-glued or even subsequently glued, into lamination stacks in a punching and stacking process, it is known from the prior art (WO2014/089593A1), in order to facilitate the separation of the stacked lamination parts into lamination stacks, to laminate a release film onto some regions of the electrical strip before the gang punching tool. Thus before the lamination parts are punched out, the electrical strip is prepared in a subregion of the hot-melt adhesive varnish layer in such a way that after the lamination part, which comprises this prepared subregion, is punched out, an integral connection with an adjacent lamination part cannot form.

The application of the release film requires a very exact positioning in relation to the lamination part that is to be detached, which, as the end or beginning of a lamination stack, marks the division of the lamination stacks in the stack brake. In order to obtain geometrically accurate lamination stacks, such a device is relatively complex—or else a high level of reproducibility cannot be achieved.

SUMMARY OF THE INVENTION

The object of the invention, therefore, is to improve a method of the type described at the beginning in such a way that a separation of the integrally joined lamination parts into lamination stacks can be reproducibly achieved in a simple way from a process engineering standpoint.

The invention attains the stated object with regard to the method in that in the preparation of the electrical strip, the layer thickness of the hot-melt adhesive varnish layer on the electrical strip is at least reduced through removal by means of laser light in order to produce the subregion.

If in the preparation of the electrical strip, the layer thickness of the hot-melt adhesive varnish layer on the electrical strip is reduced through removal by means of laser light in order to produce the subregion, then first of all, this makes it possible to specify a solution that is simple from a process engineering standpoint for facilitating the separation of the punched-out and assembled lamination parts into lamination stacks.

The invention advantageously achieves the fact that after the lamination part with the prepared subregion has been punched out, this lamination part facilitates the separation of the stacked lamination parts into lamination stacks. Through the removal of the hot-melt adhesive varnish layer, a reduced or eliminated adhesive action between the adjoining lamination parts can be expected—which, as a kind of predetermined breaking point, can ensure the separation of the lamination parts into exact lamination stacks. It is thus possible, among other things, to increase the reliability of the method. In general, it should be noted that the hot-melt adhesive varnish layer can be partially or completely removed in terms of its layer thickness—i.e. can be either just reduced or removed entirely.

In addition, such preparation of the electrical strip with laser light can excel in terms of reproducibility because this removal, for example by means of control or regulation engineering measures, can comply with the strict tolerance requirements of the punching. This makes it possible to achieve a reproducible separation of the integrally joined lamination parts into lamination stacks—which ensures a high geometrical accuracy of the lamination stacks.

Such lamination stacks are thus particularly suitable for use in electric machines and for electrical or electromagnetic applications. This especially also applies to stacks of electrical steel.

In general, it should be noted that the electrical strip can be a semi-finished product made of steel, which can, for example, be a cold-rolled, non-grain-oriented electrical strip in the finally annealed state (DIN EN10106) or a grain-oriented electrical strip in the finally annealed state (DIN EN10107).

It should also be generally noted that "laser light" is understood to be the radiation of one or more lasers. In this case, for example, $CO_2$ lasers or the like can be used.

In general, it should also be noted that the electrical strip is coated on one or both of its flat sides with a hot-melt adhesive layer, i.e. a curable polymer adhesive layer, in order to facilitate the integral joining of the lamination parts into dimensionally stable lamination stacks. Preferably, a baked varnish can be suitably used as the hot-melt adhesive layer—a heat-curing baked varnish layer can be particularly excellent for this purpose. The lasers used in this case can be positioned on both the top flat side and bottom flat side or on both flat sides of the electrical strip.

If the hot-melt adhesive varnish layer in the subregion is removed down to a residual layer thickness, then it is possible to further increase the reproducibility of the method. In this way, it is specifically possible, by means of the residual layer thickness remaining on the electrical strip or more specifically, on the punched-out lamination part, to safeguard a protective layer over the lamination material in order to protect the lamination stack from corrosion, for example. It is also possible, with the removal of the hot-melt adhesive varnish layer down to the residual layer thickness, to already achieve a sufficient reduction of the adhesive properties to enable a simple separation of the integrally joined lamination parts into lamination stacks. By combining these advantages, laser light can turn out to be extremely advantageous.

With regard to the advantages mentioned above, particularly outstanding results can be achieved if the hot-melt adhesive varnish layer is removed down to a residual layer thickness of at least 1 μm. In this regard, it can prove to be particularly valuable to remove it down to a residual layer thickness of at least 1.5 μm.

The method can also be improved in terms of its reproducibility if the hot-melt adhesive varnish layer is thermally activated in the subregion by means of laser light. During the removal of the hot-melt adhesive varnish layer, it is thus possible, for example, to heat the hot-melt adhesive varnish layer across its residual layer thickness and thus to thermally activate and cure the hot-melt adhesive layer. It is thus possible to reduce the adhesiveness of the hot-melt adhesive varnish layer or to deactivate it in order to ensure a reliable separation of adjacent lamination parts into lamination stacks.

If the hot-melt adhesive varnish layers of the electrical strip, which is coated with a hot-melt adhesive varnish layer on each of its opposing flat sides, is at least partially removed in its respective layer thickness by means of laser light in order to produce subregions on the lower and upper flat side of the electrical strip, it is then possible, among other things, to accelerate the method sequence. The method can also be improved in terms of its reproducibility in that with an electrical strip that is coated with hot-melt adhesive varnish on both sides, the two hot-melt adhesive varnish layers of two adjacent lamination stacks that face each other can each be correspondingly removed in order to enable a simple separation of the lamination stacks. The removal of the hot-melt adhesive varnish layer on the opposing flat sides in this case can be carried out in reciprocal fashion in such a way that after the punching-out, two lamination parts respectively adjoin each other with their at least partially removed hot-melt adhesive varnish layers.

In general, it should be noted that the removal of the hot-melt adhesive varnish layer on the bottom and top flat side of the electrical strip can take place simultaneously.

If the lower subregions are positioned so that they are offset in the advancing direction of the electrical strip relative to the upper subregions of the flat side of the electrical strip, then it is easily possible, after the punching, for lamination parts to be stacked in the stacking unit with their removed subregions oriented toward each other. This permits a particularly simple subsequent separation into lamination stacks and thus the achievement of a more reliable method.

According to the invention, these advantages, particularly with regard to reproducibility, can be preserved even if the lamination parts are gang punched from the electrical strip—according to the invention, among other things, the complex positioning of a release agent according to the prior art is no longer important.

If the lamination part is punched out in the removed subregion of the hot-melt adhesive varnish layer, it is thus possible to achieve high degrees of fit precision of the removed subregions relative to the punched-out lamination parts. It is thus possible to achieve a particularly reliable method.

The method according to the invention can excel by means of its simplicity from a process engineering standpoint in that the laser light is deflected in the transverse direction relative to the advancing direction of the electrical strip. In this regard, it can prove to be valuable if the laser light is deflected in oscillating fashion in the transverse direction relative to the advancing direction of the electrical strip. In connection with the advancing direction of the electrical strip, it is possible to enable the removal of the hot-melt adhesive varnish layer in all directions of the electrical strip.

Another stated object of the invention is to modify the design of a device for connecting lamination parts to form a lamination stack in such a way that the separation of the integrally joined lamination parts into lamination stacks can take place in a stable fashion in order to manufacture geometrically accurate lamination stacks. In addition, the device should be embodied with a simple design.

The invention attains the stated object with regard to the device in that the unit before the punching stage has at least one laser with a deflecting device for at least reducing the layer thickness of the hot-melt adhesive varnish layer in the subregion through removal by means of laser light from the laser.

Because the unit before the punching stage has at least one laser with a deflecting device for at least reducing the layer thickness of the hot-melt adhesive varnish layer in the subregion through removal by means of laser light from the laser, an exact removal of the hot-melt adhesive varnish layer can already be performed before the punching stage, as a result of which a geometrically accurate and simple separation of the stacked lamination parts into precisely dimensioned lamination stacks can always take place. It is therefore possible to achieve a particularly stable and simply designed method. As has already been mentioned above, it is conceivable for the hot-melt adhesive varnish layer to be partially or completely removed in terms of its layer thickness—i.e. for it to be either just reduced or removed entirely. A residual layer thickness remaining on the electrical strip or more specifically, on the punched-out lamination part, can safeguard the above-mentioned protective layer over the lamination material in order to protect the lamination stack from corrosion, for example.

In general, it should be noted that with electrical strips, which are coated with hot-melt adhesive varnish on both sides, at least one laser with a defecting device can be provided on each flat side of the electrical strip. This enables an independent removal of the hot-melt adhesive varnish layers on the two flat sides of the electrical strip.

BRIEF DESCRIPTION OF THE DRAWINGS

The subject of the invention is shown by way of example in the drawings based on an embodiment variant. In the drawings.

DETAILED DESCRIPTION OF THE PREFERRED EMBODIMENTS

Figure 1:
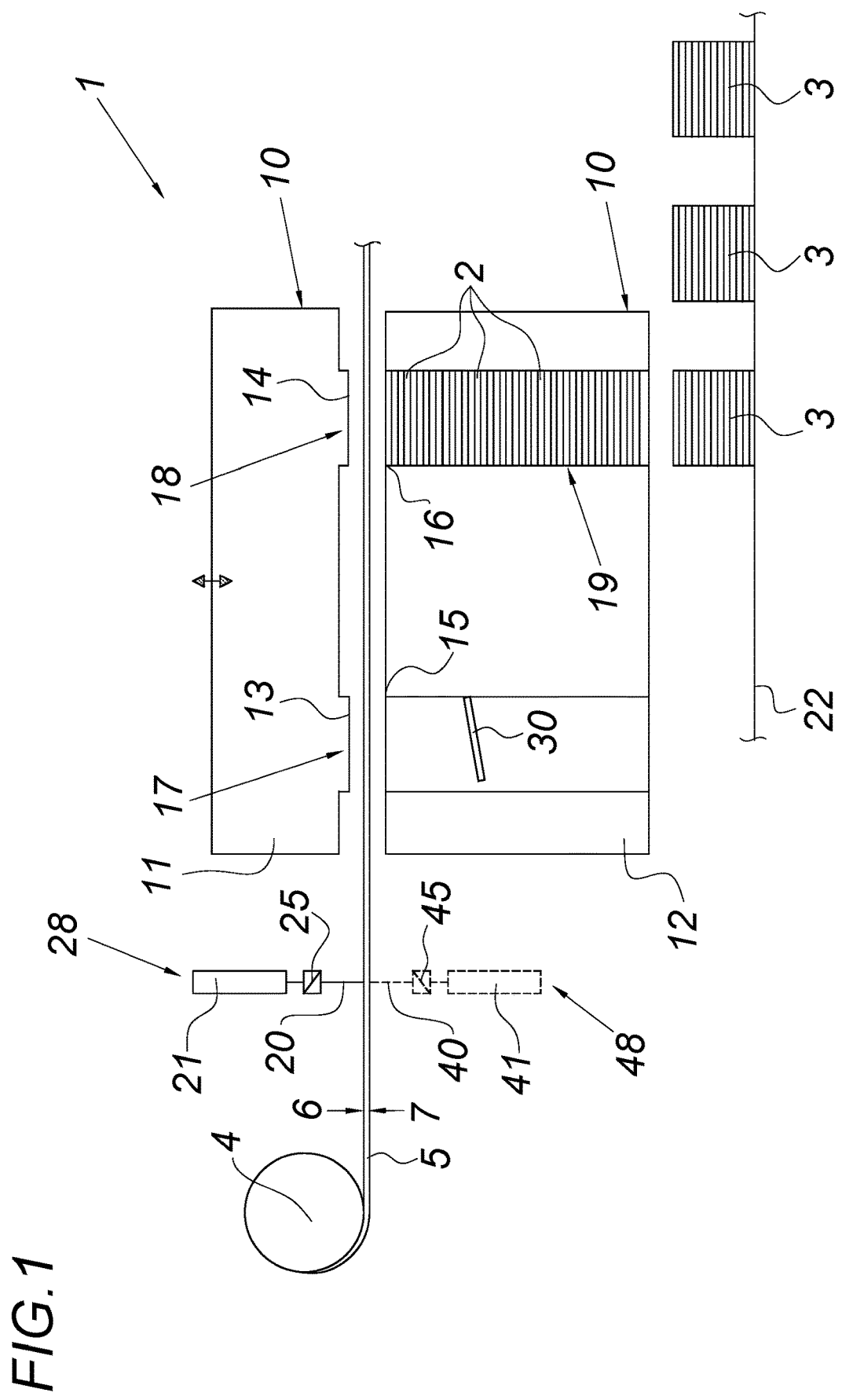
FIG. 1 shows a schematic view of a device for lamination stacking.

FIG. 1 schematically depicts a device 1 according to the exemplary embodiment for carrying out the method according to the invention. This device 1 is used for stacking punched-out lamination parts 2 into lamination stacks 3. To this end, an electrical strip 5 is unwound from a coil 4, which strip is completely covered on one or both of its flat sides 6, 7 with a hot-melt adhesive layer 8, 9, namely a heat-curing baked varnish—which hot-melt adhesive layer 8, 9 is shown for example in FIG. 3.

With the aid of a gang punching tool 10, multiple lamination parts 2 are punched out of the baked varnish-coated electrical strip 5. Such a punching-out—it should be generally mentioned—can be a cutting-out, cutting-off, trimming, cropping, division by ejection, etc.

As can also be inferred from FIG. 1, the punching tool 10, for example a gang punching tool 10 in this case, carries out a cutting procedure with a plurality of strokes in which its upper tool 11 cooperates with its lower tool 12. With a first cutting edge 13 of the upper tool 11, the electrical strip 5 is pre-machined for a punching-out, after which, with a second cutting edge 14 of the upper tool 11, the lamination part 2 is punched out and thus separated from the electrical strip 5. To this end, the cutting edges 13, 14 cooperate with the respective matrixes 15, 16 of the lower tool 12 and thus compose two punching stages 17, 18 in the punching tool 10.

Such a gang cutting procedure is visible in FIG. 1 from the fact that in the pre-machining, a part 30 is separated from the electrical strip 5 in order to prepare the electrical strip 5 for the punching-out of the lamination part 2. Then, the lamination parts 2 are punched out with the aid of the punching stage 18 and, with pressure from the upper tool 11, are pushed into and stacked in a stacking unit 19, which has a partly tapering guide 31 in the lower tool 12. This guide 31—see FIG. 3 in this regard—in the lower tool acts like a stack brake on the lamination parts 2, by means of which the lamination parts 2, under the pressure of the upper tool 11 and with the aid of the hot-melt adhesive layer 8, 9 that is present between the lamination parts 2, form a solid physical and/or chemical connection. In general, it should be noted that the stacking unit 19 can also be actively heated in order to improve the integral joining of the lamination parts 2.

In addition, the lamination stacks 3 can be subjected to additional curing steps, not shown, in order to strengthen the integral connection between the lamination parts 2. Furthermore, it is possible to rotate the stacking unit 19 in order, for example, to form segmented lamination stacks 3 composed of layers with a plurality of lamination parts 2 positioned next to one another and stacked on top of one another—which is likewise not shown. In general, it should be noted that alternatively to the tapering, it is also conceivable for a brace—not shown—to be provided in the guide, which exerts a corresponding counter-pressure for the integral joining of the lamination parts 2.

In order to be able to more easily separate the lamination stacks 3 exiting the stacking unit 19 from one another, before the punching in the punching tool 10, the layer thickness 29, 49 of at least one hot-melt adhesive varnish layer 8, 9 or both hot-melt adhesive varnish layers 8, 9 on the flat sides 6, 7 of the electrical strip 5 is/are reduced through removal by means of laser light 20, 40 that is produced by at least one laser 21, 41 positioned before the punching tool 10, thus enabling a separation of stacked lamination parts 2 into lamination stacks 3—in other words, in the exemplary embodiment, only a part of the layer thickness 29, 49 of the hot-melt adhesive varnish layers 8, 9 is removed.

Figure 2:
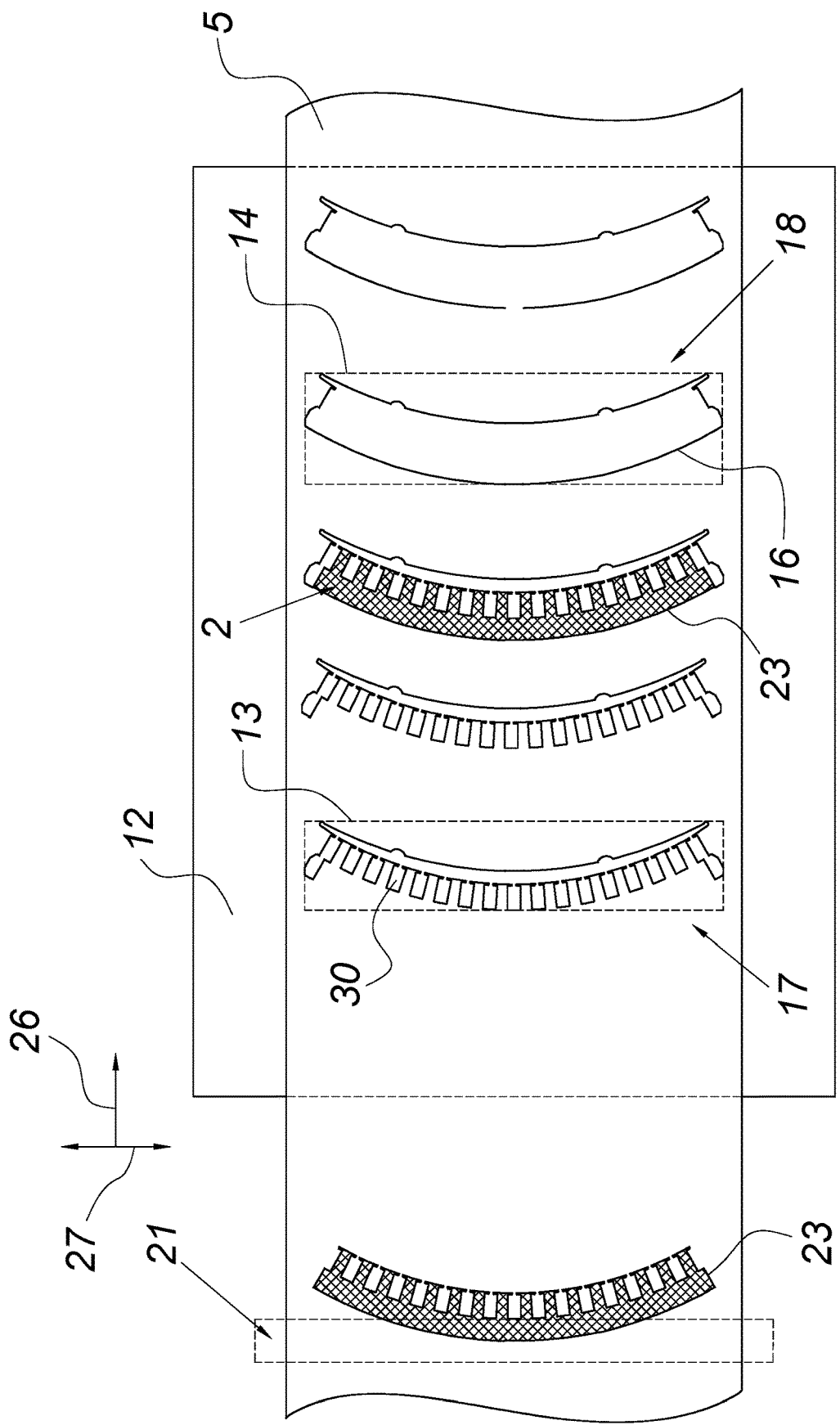
FIG. 2 shows a top view of the gang punching tool of the device in FIG. 1.
Figure 4:
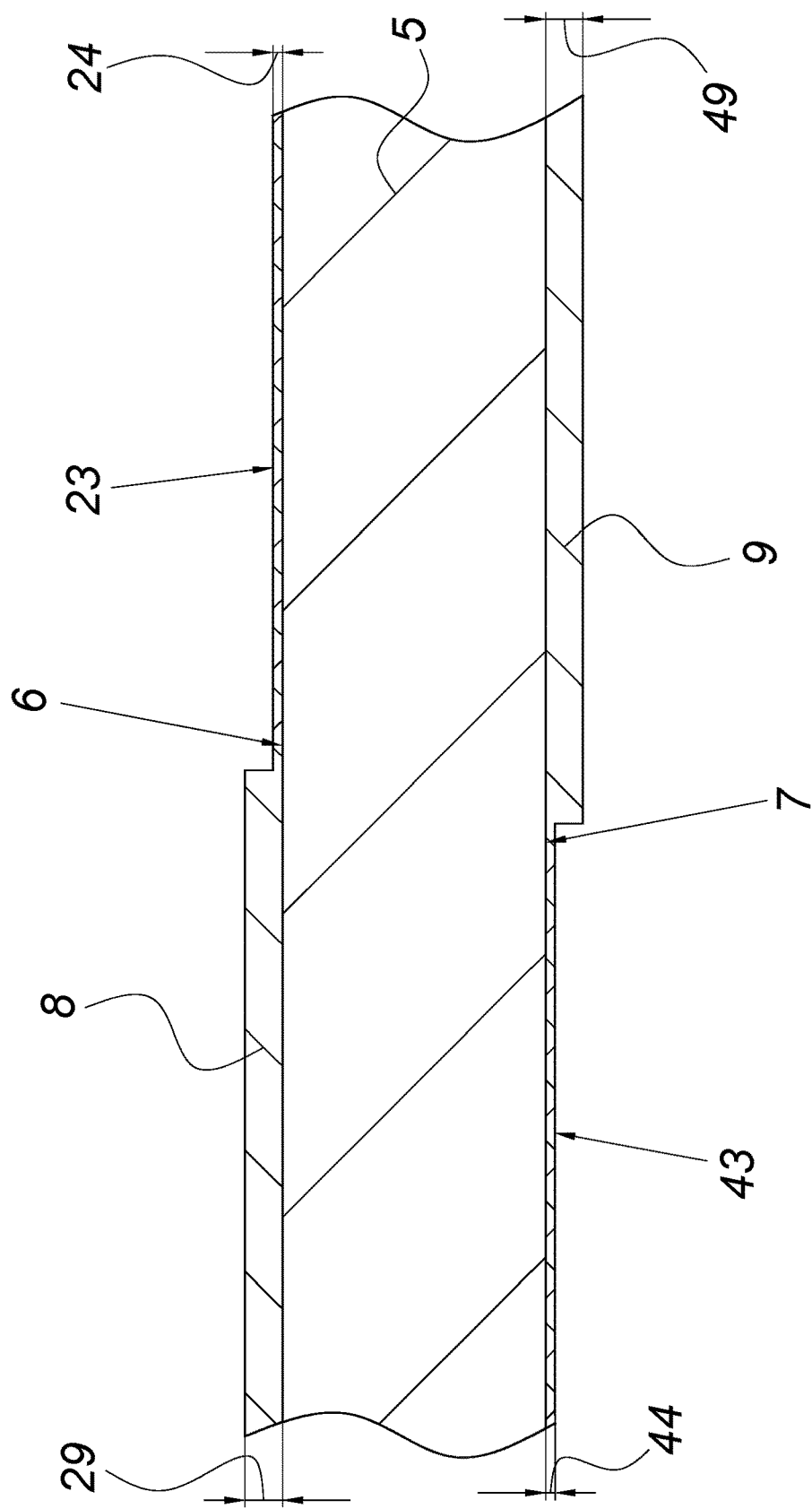
FIG. 4 shows a cut-away cross-sectional view of the electrical strip.

Through the action of the laser light 20, 40 and the partial removal of the hot-melt adhesive varnish layer 8, 9, a subregion 23, 43 on the lamination part 2 is produced—as shown in FIG. 4. In this case, this subregion 23—see FIG. 2—is provided in the region of the lamination part 2 that is to be punched out later so that the lamination part 2 is subsequently punched out in the subregion 23. The removed subregion 23, 43 thus corresponds to the region that the lamination part 2 is punched out from.

The corresponding precision can be achieved by means of the preparation of the subregions 23, 43 according to the invention—it is not just a simplification of the method, it also permits a particularly precise separation of the lamination parts 2 adjoining the subregion 23, 43. In particular, this can be achieved even if the subregion 23, 43 produced by means of laser light 20, 40 is larger than the lamination part 2 that is to be punched out—but this is not shown in the figures. It is thus possible to achieve a reliable separation of the stacked and integrally joined lamination parts 2 into precise lamination stacks 3—particularly even at the point when the lamination parts 2 are exiting the stacking unit 19 and they are, for example, provided for further transport on a conveyor belt 22.

Figure 3:
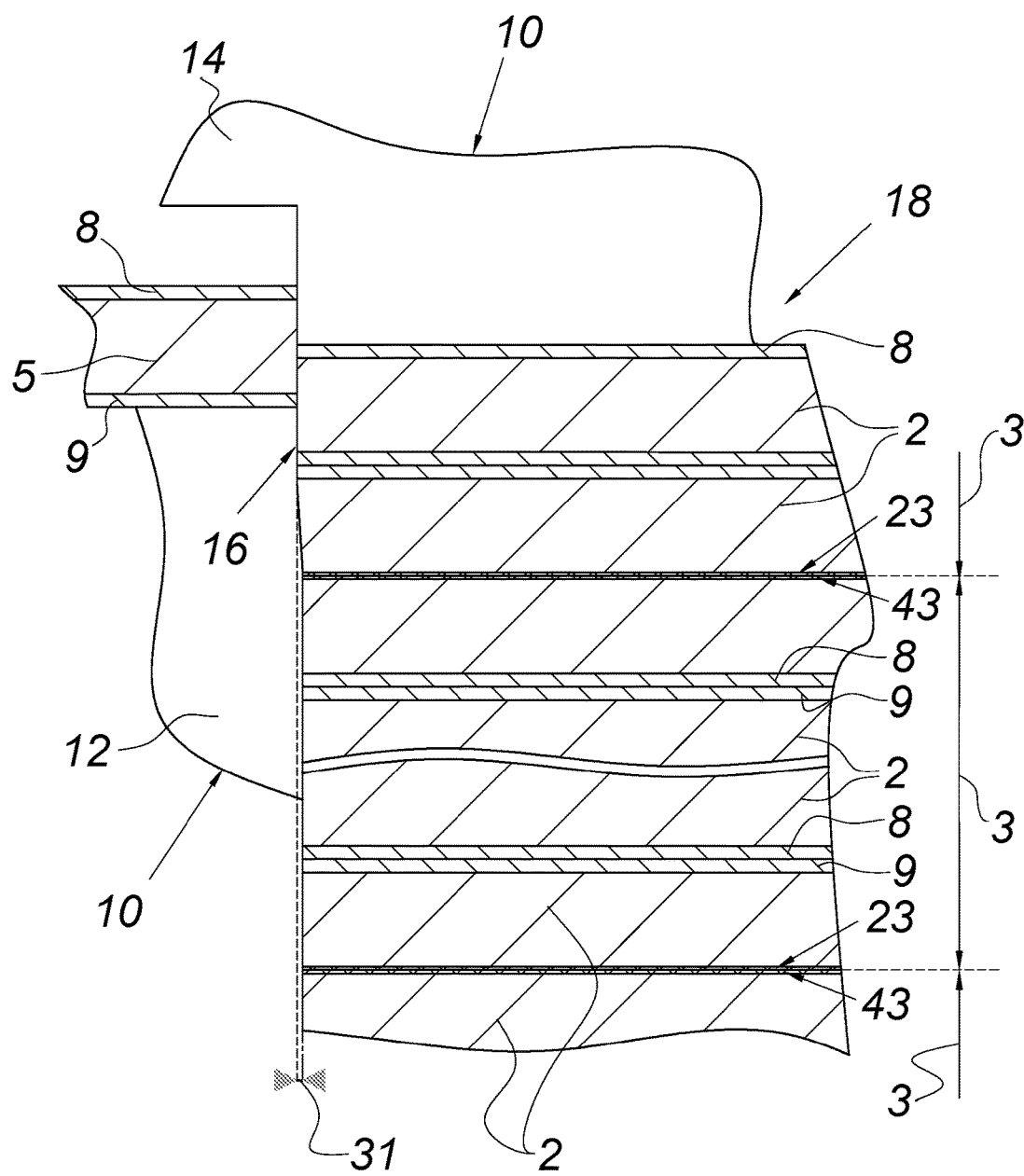
FIG. 3 shows a cut-away detail view of the stack brake in FIG. 1.

FIGS. 3 and 4 show an electrical strip 5 that is coated on both of its flat sides 6, 7 with a respective hot-melt adhesive varnish layer 8, 9. It is also possible, however, for the hot-melt adhesive varnish layer 8, 9 to be provided on only one flat side 6, 7 of the electrical strip 5 and for the produced subregion 23, 43 to likewise be provided on this flat side 6, 7 through removal of the hot-melt adhesive varnish layer 8, 9. The removal of the hot-melt adhesive varnish layer 8, 9 on both sides—as shown in FIG. 4—in this case preferably takes place in such a way that the subregions 23, 43 are positioned so that they are offset from each other in the advancing direction 26 of the electrical strip 5. After the punching-out, the lamination parts 2 are stacked with their subregions 23, 43 facing each other in the stacking unit 19—as a result of which a particularly simple subsequent separation into lamination stacks 3 can take place. The latter can be inferred from FIG. 3.

In the exemplary embodiment, the hot-melt adhesive varnish layer 8, 9 on the electrical strip 5 is only partially removed, particularly until there is a remaining residual layer thickness 24, 44, and thus the subregion 23, 43 is produced—which can be particularly inferred from FIG. 4. The residual layer thickness 24, 44 is preferably 1 μm since with this residual layer thickness 24, 44, it is possible to ensure that the hot-melt adhesive varnish layer 8, 9 is not removed down to the electrical strip 5 at any point—which would expose the lamination part 2 to external influences, especially to corrosion, and would thus sharply reduce the service life of the lamination stack 3. The above-mentioned advantages are especially also achieved with a residual layer thickness 24, 44 of 1.5 μm. Through the action of laser light 20, 40, the hot-melt adhesive varnish layer 8, 9 is not only removed, but also thermally activated, as a result of which, its adhesiveness is deactivated. Consequently, the separation of the lamination parts 2 into lamination stacks 3 can be further simplified and the method can be embodied as even more reliable.

The laser 21, 41 also has a deflecting device 25, 45, which deflects the laser 21, 41 in the transverse direction 27 relative to the advancing direction 26 of the electrical strip 5, across the entire width of the electrical strip 5. As a result, together with the advancing motion of the electrical strip 5, a reliable and rapid removal of the hot-melt adhesive varnish layer 8, 9 can take place in all directions of the electrical strip 5. Such an embodiment can also be implemented with a particularly simply design. The laser 21, 41 in this case can particularly be moved with an oscillating motion across the width of the electrical strip 5 by the deflecting device 25, 45 in order to partially remove the hot-melt adhesive varnish layer 8, 9—preferably down to the residual layer thickness 24, 44. In electrical strips 5 that are coated with a hot-melt adhesive varnish layer 8, 9 on both of their flat sides 6, 7, preferably at least one laser 21, 41 is provided on each flat side 6, 7 of the electrical strip 5—as shown in FIG. 1. It is therefore possible for the removal of the hot-melt adhesive varnish layers 8, 9, i.e. for each flat side 6, 7, to be independently and thus simultaneously carried out—which accelerates the method considerably.

The invention claimed is:

1. A method for connecting lamination parts to form a lamination stack, comprising:
   providing an electrical strip having two flat sides, with at least one of the two flat sides coated with a hot-melt adhesive varnish layer;
   preparing the electrical strip by at least reducing a layer thickness of the hot-melt adhesive varnish layer on the electrical strip down to a residual layer thickness through removal using laser light in order to produce a subregion of the hot-melt adhesive varnish layer;
   punching out a plurality of lamination parts from the electrical strip;
   stacking the plurality of lamination parts that have been punched out, and then connecting the plurality of lamination parts in an integrally joined manner through thermal activation of the hot-melt adhesive varnish layer to form a plurality of lamination stacks;
   wherein before the plurality of lamination parts are punched out, the electrical strip is prepared in the subregion of the hot-melt adhesive varnish layer in such a way that after the plurality of lamination parts, which comprise the prepared subregion, are punched out, the plurality of lamination parts facilitate a separation of the stacked lamination parts into the plurality of lamination stacks.

2. The method according to claim 1, comprising removing the hot-melt adhesive varnish layer in the subregion down to a residual layer thickness of at least 1 μm.

3. The method according to claim 1, comprising removing the hot-melt adhesive varnish layer in the subregion down to a residual layer thickness of at least 1.5 μm.

4. The method according to claim 1, comprising thermally activating the hot-melt adhesive varnish layer in the subregion using laser light.

5. The method according to claim 1, wherein the electrical strip is coated with the hot-melt adhesive varnish layer on each of its two flat sides, and comprising at least partially removing the hot-melt adhesive varnish layers of the electrical strip using laser light in order to produce subregions on the two flat sides of the electrical strip, wherein the two flat sides are an upper side and a lower side.

6. The method according to claim 5, wherein the subregions on the lower side are offset in an advancing direction of the electrical strip relative to the subregions on the upper side of the electrical strip.

7. The method according to claim 1, wherein the lamination parts are gang punched out from the electrical strip.

8. The method according to claim 1, wherein the lamination part is punched out in the removed subregion of the hot-melt adhesive varnish layer.

9. The method according to claim 1, wherein the laser light is deflected in a transverse direction relative to an advancing direction of the electrical strip.

10. The method according to claim 9, wherein the laser light is deflected in an oscillating fashion in the transverse direction relative to the advancing direction of the electrical strip.

* * * * *